United States Patent
Theimer et al.

(10) Patent No.: US 8,429,187 B2
(45) Date of Patent: Apr. 23, 2013

(54) METHOD AND SYSTEM FOR DYNAMICALLY TAGGING METRICS DATA

(75) Inventors: Marvin M. Theimer, Bellevue, WA (US); Eric J. Brandwine, Haymarket, VA (US); David Brown, Sunningdale (ZA); Marc J. Brooker, Cape Town (ZA); Erik J. Fuller, Western Cape (ZA)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/053,143

(22) Filed: Mar. 21, 2011

(65) Prior Publication Data

US 2012/0246157 A1  Sep. 27, 2012

(51) Int. Cl.
*G06F 17/30* (2006.01)

(52) U.S. Cl.
USPC .......................................... 707/769; 717/127

(58) Field of Classification Search ................. 707/769; 717/127
See application file for complete search history.

(56) References Cited

U.S. PATENT DOCUMENTS

| | | | |
|---|---|---|---|
| 5,761,663 A * | 6/1998 | Lagarde et al. | 709/202 |
| 5,936,622 A | 8/1999 | Halverson et al. | |
| 6,903,756 B1 | 6/2005 | Giannini | |
| 7,062,757 B2 * | 6/2006 | Honarvar et al. | 717/127 |
| 7,100,152 B1 * | 8/2006 | Birum et al. | 717/131 |
| 7,103,843 B2 | 9/2006 | Hand et al. | |
| 7,444,263 B2 | 10/2008 | White et al. | |
| 7,765,525 B1 * | 7/2010 | Davidson et al. | 717/124 |
| 7,801,955 B2 | 9/2010 | Dayan et al. | |
| 8,196,047 B2 | 6/2012 | Fisher et al. | |
| 2003/0156136 A1 | 8/2003 | Cattell et al. | |
| 2005/0283736 A1 | 12/2005 | Elie | |
| 2006/0031787 A1 | 2/2006 | Ananth et al. | |
| 2008/0148168 A1 | 6/2008 | Koran et al. | |
| 2008/0172629 A1 | 7/2008 | Tien et al. | |
| 2008/0172630 A1 | 7/2008 | Dang et al. | |
| 2008/0263469 A1 | 10/2008 | Nasle et al. | |
| 2009/0113397 A1 * | 4/2009 | Wright, Sr. | 717/127 |
| 2009/0192879 A1 | 7/2009 | Hood | |
| 2009/0265707 A1 | 10/2009 | Goodman | |
| 2010/0017466 A1 | 1/2010 | Trauner | |
| 2012/0079098 A1 * | 3/2012 | Moehler et al. | 709/224 |

OTHER PUBLICATIONS

International Search Report and Written Opinion; Application No. PCT/US2012/029701, filed Mar. 19, 2012, mailed on Sep. 7, 2012.
U.S. Appl. No. 12/888,804, filed Sep. 23, 2010, together with U.S. Filing Receipt.

* cited by examiner

*Primary Examiner* — Kim Nguyen

(74) *Attorney, Agent, or Firm* — Knobbe, Martens, Olson & Bear LLP

(57) ABSTRACT

Embodiments of systems and methods are described for dynamically tagging metrics data by a provider of computing resources. In some implementations, a requesting user or application can request the provider of computing resources to tag the metrics based on configurations and/or settings specified by the requesting user or application. The tagged metrics data can then be processed by a processing user or application at a later time.

29 Claims, 7 Drawing Sheets

METHOD AND SYSTEM FOR DYNAMICALLY TAGGING METRICS DATA

BACKGROUND

Companies and organizations operate computer networks that interconnect numerous computing systems to support their operations. The computing systems can be located in a single geographical location (e.g., as part of a local network) or located in multiple distinct geographical locations (e.g., connected via one or more private or public intermediate networks). Data centers can house significant numbers of interconnected computing systems, such as, e.g., private data centers are operated by a single organization and public data centers operated by third parties to provide computing resources to customers. Public and private data centers can provide network access, power, hardware resources (e.g., computing and storage), and secure installation facilities for hardware owned by the data center, an organization, or by other customers.

To facilitate increased utilization of data center resources, virtualization technologies can allow a single physical computing machine to host one or more instances of virtual machines that appear and operate as independent computer machines to a connected computer user. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

As the scale and scope of data centers has increased, the task of provisioning, administering, and monitoring the physical and virtual computing resources of the data center has become increasingly complicated.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
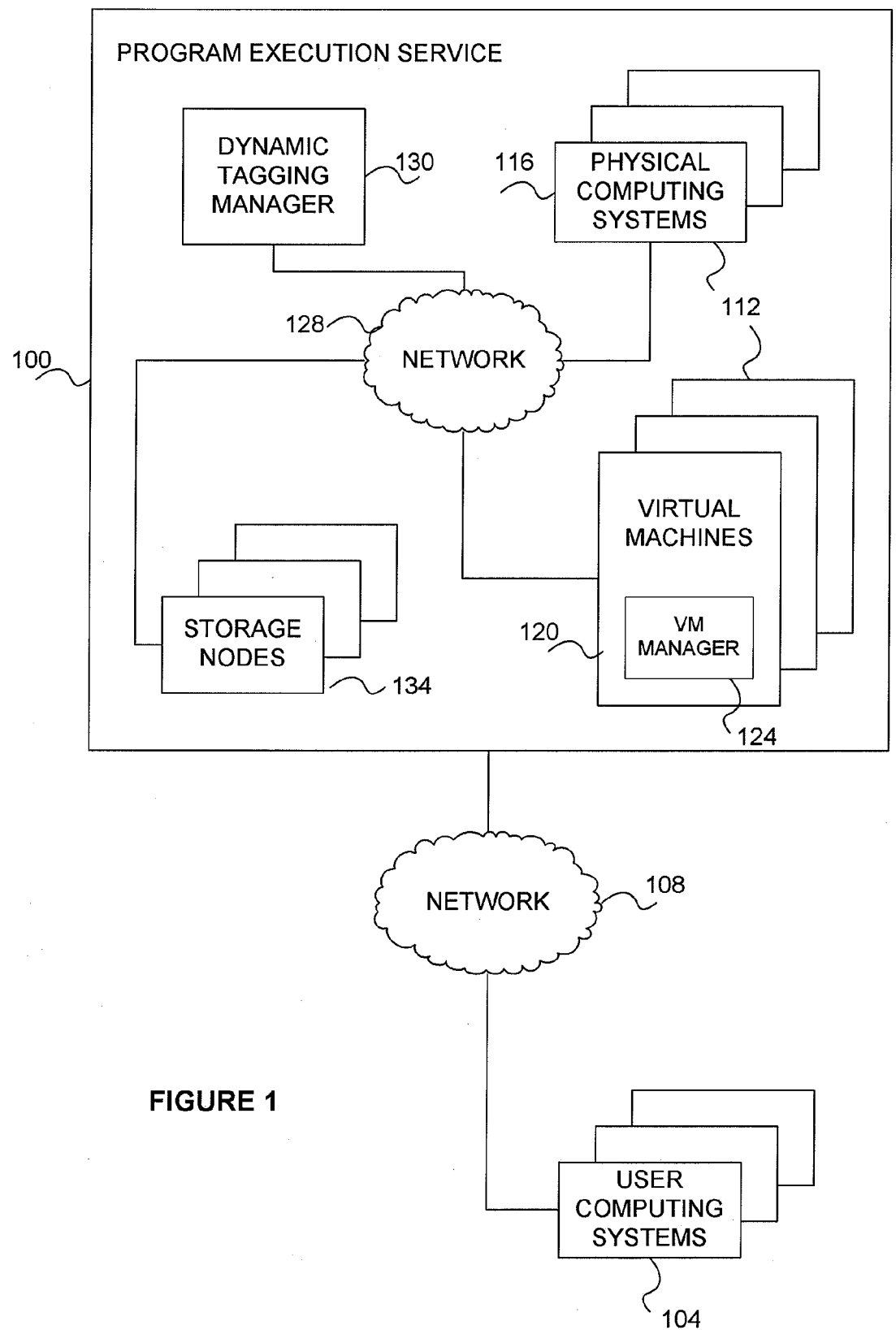
FIG. 1 is a network diagram schematically illustrating an example of a program execution service that can provide computing resources to multiple user computing systems via a communication network.

Embodiments of systems and methods are described for dynamically tagging metrics data by a provider of computing resources. Illustratively, the computing resources can include program execution capabilities, data storage or management capabilities, network bandwidth, etc. In some implementations, a user can request that a virtualization infrastructure be generated that can manage and reserve computer resources for the user during a future usage time period. For example, the user can request a virtualization infrastructure be generated that can manage and reserve data storage or network bandwidth for the user during the future usage period. The computing resource provider can determine which of the provider's computer resources can be made available to meet the user's request and can allocate those computer resources to the user during the requested usage period.

The virtualization environment can be a run-time environment that includes an application software stack for the user's program together with one or more infrastructure services for executing the user's program on the program execution service. The virtualization environment can include a user-selectable operating system (e.g., Linux, Windows, etc.), application server (e.g., Apache Tomcat), system or application configuration, etc. The virtualization environment can be configured to be hosted at a specific URL. The infrastructure services can include, but are not limited to, a load balancer to distribute workload across the requested computing resources, a load scaler to scale computing resources in response to load or demand variations, a firewall or other service to control access to the computing resources, a monitoring interface that permits the user to monitor execution of the program, data storage resources (e.g., scalable volume block storage), and so forth. In some embodiments, the user may be able to select one or more programs or services that can be included in the virtualization infrastructure. For example, the user may be able to select from a plurality of database models (e.g., a relational database, SQL database, Oracle database, etc.). In some embodiments, the infrastructure services can be customized to the user rather than being a shared resource among a plurality of users. For example, in some such embodiments, the load balancer can be individually customized to the user's application rather than being shared or distributed among a number of users of the program execution service.

Metrics data can be collected for the various computing resources that have been allocated for a user. Metrics data of the computing resources can be analyzed, trended, reported, etc. to monitor the usage patterns and functioning of the computer resources. Metrics data can be collected by the program execution service or another service. For example, operational performance, resource utilization, demands patterns, etc. of the computer resources can be measured. In some implementations, the metrics data can be tagged as requested by a requesting user or application. The requesting user or application can request the virtualization infrastructure to add any key/value pairs to the metrics data so that the tagged metrics data could later be processed. The tagged metrics data can then be outputted to a processing user or application.

As used herein, in addition to having its ordinary meaning, the term "measurement" can mean an observed value with a set of attributes. For example, a measurement can include a name, a set of dimensions, a namespace, a unit, and/or a timestamp among possibly other (or fewer) characteristics. As used herein, in addition to having its ordinary meaning, the term "dimension" can be used to specify how a measurement can be aggregated, such as by InstanceID, InstanceType, Availability Zone, or other factors (described in detail below). As used herein, in addition to having its ordinary meaning, namespace identifies the service that collected the measurement. Furthermore, as used herein, in addition to having its ordinary meaning, a metric can include an aggregation of measurements data.

A user can specify one or more metrics that specify how the various measurements are to be aggregated. For instance, metrics data can include the same attributes as the measurements data and can be the aggregate of some or all measurements with a given name, within a given period of time. As another example, a metric can include an aggregation of some or all of the measurements in a particular namespace, or another metric can include an aggregation of some or all measurements having a particular InstanceID. A metric can, in some embodiments, be an aggregation of other metrics. As a result of this flexibility, in certain embodiments, metrics include a variety of dimensions based on the preferences of the user. As used herein, in addition to having its ordinary meaning, the term "tag" can mean any key/value pair associated with a particular metric. For example, a tag can indicate the key "instanceID" for a particular metric has a value of "123456." As another example, a tag can indicate the key "customerID" for a particular metric has a value found at record "12, 5" in a certain data store.

Various aspects of the disclosure will now be described with regard to certain examples and embodiments, which are intended to illustrate but not to limit the disclosure.

FIG. 1 is a network diagram schematically illustrating an example of a program execution service 100 that can provide computing resources to multiple user computing systems 104 via a communication network 108. The program execution service 100 can be a web service or a collection of web services that can provide computing resources for rent to use for web and/or other application hosting. For example, the program execution service 100 can manage requests from a user to execute a program, or set of programs, on behalf of the user. At least some of the user computing systems 104 can be remote from the program execution service 100. In this example, users can use the computing systems 104 to access the program execution service 100 over the communication network 108. The network 108 can, for example, be a publicly accessible network of linked networks, such as the Internet, possibly operated by various distinct parties. In other embodiments, the network 108 can be a private network, such as, for example, a corporate or university network that is wholly or partially inaccessible to non-privileged users. In still other embodiments, the network 108 can include one or more private networks with access to and/or from the Internet.

The program execution service 100 provides a variety of functionality for managing execution of programs for multiple users. In the example illustrated in FIG. 1, the program execution service 100 includes a plurality of computing nodes 112 that can execute programs on behalf of the users. The computing nodes 112 can include one or more physical computing systems 116 and/or one or more virtual machines 120 that are hosted on one or more physical computing systems. For example, a host computing system can provide multiple virtual machines 120 and include a virtual machine ("VM") manager 124 to manage those virtual machines (e.g., a hypervisor or other virtual machine monitor).

In the example illustrated in FIG. 1, each of the computing nodes 112 has some amount of computing resources available for executing one or more programs. Each computing node 112 can provide a specific amount of program execution capacity, which can be measured, for example, by a combination of one or more of processing capacity (e.g., number and/or size of processing units), memory capacity, storage capacity, network bandwidth capacity, non-network communication bandwidth, etc. In some embodiments, the program execution service 100 can provide preconfigured computing nodes 112, with each preconfigured computing node having similar and/or equivalent amounts of resources available for executing programs on behalf of users. In other embodiments, the program execution service 100 can provide a selection of various different computing nodes 112 from which a user can choose for executing programs on behalf of the user. In yet other embodiments, the program execution service 100 can generate various computing nodes that are specific to a user and execution of the user's program. In some such embodiments, the computing nodes 112 can have varying amounts and/or types of computing resources (e.g., size, speed and/or type of processing units; number of processing units; amount of memory and/or storage; platform configuration, such as 32-bit or 64-bit, operating system, etc.).

The program execution service 100 can provide user computing systems 104 with access to storage nodes 134 that provide mass storage of data, programs, and other user information. The storage nodes 134 can include any type of persistent data storage, for example non-volatile memory devices such as, e.g., hard disk drives, optical disk drives, etc. In the example illustrated in FIG. 1, the computing nodes 112 can access the storage nodes 134 via a network 128. The network 128 can include multiple networking devices (not shown) such as, e.g., switches, edge routers, core routers, etc. The network 128 can, but need not be, a different network than the network 108 shown in FIG. 1.

Users or applications of the program execution service 100 can interact with the program execution service 100 via a dynamic tagging manager 130. For instance, users or applications can request tagging of one or more metrics associated with resources of the program execution service 100 that have been used on behalf of the user (e.g., resource utilization and/or demand patterns). The dynamic tagging manager 130 can be connected to or in communication with the computing nodes 112 and the storage nodes 134 via the network 128. The dynamic tagging manager 130 can receive requests for tagging of metrics from the user computing systems 104 over the network 108. A user (or other users authorized by the user) can request via the dynamic tagging manager 130 that the service 100 tag one or more measurements associated with the computing nodes that can later be presented to a processing user or application. In some implementations, a user can request the dynamic tagging manager 130 to tag metrics data that has been collected by a different service. For example, the metrics data can relate to performance of network resources (e.g., traffic, latency, speed, errors, etc.); performance of sales of goods and/or services (e.g., quantity of sales, profit, return on investment, cashflow, sales targets, etc.); performances of financial resources (e.g., stocks, investments, capital gains/loses, etc.); etc.

In some embodiments, the user can request via the dynamic tagging manager 130 that the service 100 generate one or more tags for tagging the metrics on behalf of the user. Service 100 can generate the one or more tags or the user can specify which criteria the user prefers for generating the one or more tags for tagging the metrics. In various embodiments, the tagging preferences and/or settings can be specified at the time of a request for tagging of one or more metrics and/or at one or more other times, such as when a user registers and/or subscribes to use services of the program execution service 100. In some embodiments, the dynamic tagging manager 130 can provide subscription and/or registration services to one or more users, such that users can specify information related to type of metrics and/or preferences for tagging the metrics, account information (e.g., user name, billing information, etc.), terms of use, etc.

In some embodiments, after or before a user interacts with the dynamic tagging manager 130 to subscribe and/or register for services, the user can be issued one or more request identifiers (e.g., keys, tokens, user names, passwords, etc.) that are associated with the user and are to be used in conjunction with requesting tagging of the one or more metrics associated with the resources being used on behalf of the user. In other embodiments, a module other than the dynamic tagging manager 130 can be provided to perform various operations related to subscription and/or registration services of the program execution service 100.

In some embodiments, the dynamic tagging manager 130 is executed or embodied by one or more physical or virtual computing systems. For example, in some embodiments, a server computing system that has components including a CPU, I/O components, storage, and memory can be used to execute the dynamic tagging manager 130. The I/O components can include a display, a network connection to the network 128, a computer-readable media drive, and other I/O devices (e.g., a keyboard, a mouse, speakers, etc.). An embodiment of the dynamic tagging manager 130 can be stored as one or more executable program modules in the memory of the server, and the dynamic tagging manager 130 can interact with computing nodes 112 (e.g., physical computing systems 116 and/or VMs 120) over the network 128. The dynamic tagging manager 130 can receive requests from users for tagging of metrics via the network 108.

Figure 2A:
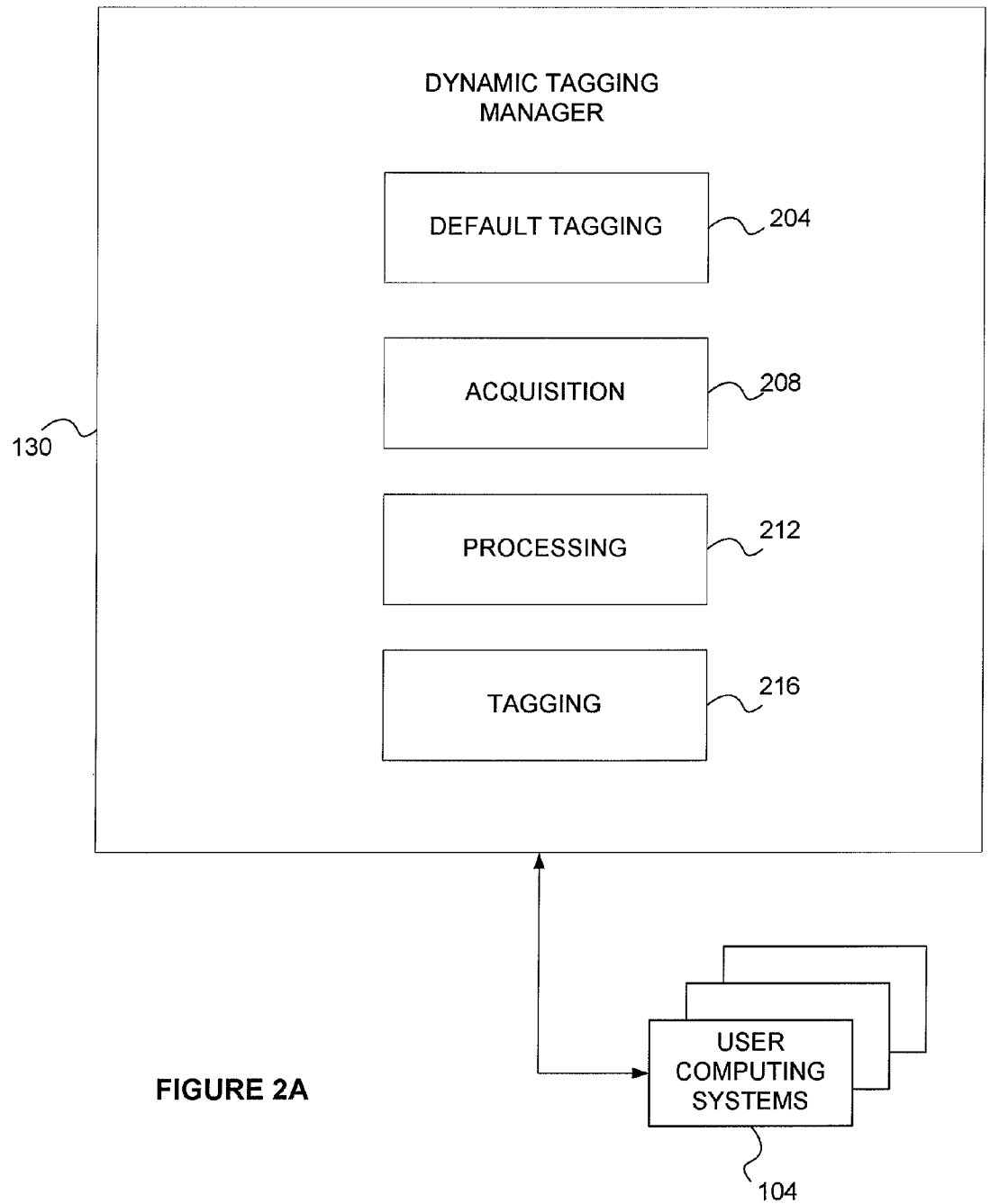
FIG. 2A is a block diagram schematic of illustrative components of a dynamic tagging manager configured to manage the tagging of metrics requested by users or applications of a program execution service.

FIG. 2A is a block diagram schematic of illustrative components of an embodiment of the dynamic tagging manager 130, which can manage requests for tagging of metrics data from users or applications. In this embodiment, the dynamic tagging manager 130 includes a default tagging module 204, an acquisition module 208, a processing module 212, and a tagging module 216.

The default tagging module 204 tags one or more metrics that have been collected by the program execution service 100 such as, e.g., resource utilization, resource monitoring, etc. This metrics data can include standard metrics that are collected by program service 100 or another service and/or can include metrics defined or created by the user, a plug-in, an extension, etc. for collection. The metrics data can include different dimensions and the users can create and/or define their own metrics. In some implementations, tagging includes inserting key/value pairs into the collected metrics (e.g., "name space"="namespace one" and/or "name"="CPU-Utilization").

The default tagging module can include as many tags that a system designer of the program execution service desires. For instance, the system designer of the program execution service can desire to tag by default respective collected metrics based on the InstanceID (e.g., ID of the instance that generated the metric), InstanceType (e.g., type of instance that generated the metric), Namespace (e.g., service that generated the metric), AvailabilityZone (e.g., region or zone that generated the metric), Name (e.g., name of the metric), ResourceType (e.g., type of resource that generated the metric), etc. The system designer can also desire to tag respective metrics with more or different tags based on one or more factors. For instance, for metrics associated with storage, the system designer may decide to tag the metrics based on database class, database type, etc. A plurality of other configurations can be implemented by the default tagging module 204 and the system designer.

The acquisition module 208 receives requests from users or applications for tagging one or more metrics managed by the program execution service 100 such as, e.g., a request that one or more additional tags be added for metrics associated with the one or more computing resources used on behalf of the user or application. The request can include some or all the tags to be added. The tags to be added can be different and in addition to the default tags discussed above. The additional tags can be tags desired by a user or application of program execution service 100 and different than the default tags designed by the system designer.

One example of additional tags could include tags that specify key/value pairs for the server type or application stack. This example tag may be desired by a user so the user or an application can later process the tagged metrics by their respective server type or stack. The user could request the acquisition module 208 to tag metrics data to include a key "serverType" and its associated value for respective metrics. As another example, additional tags could include tags associated with unique identifiers of customers. In this example, the tag may be desired by a user or application so that the user or application can process the tagged metrics based on unique identifiers associated with customers, such as for billing purposes.

As yet another example, the user could request that additional tags be added for notification of any change in state of computing resources. In this example, the additional tags could be used to by the user or application to notify any responsible parties of the status change. The user, in this example, could request that the key "ChangeNotification" be added and its respective value be assigned a value indicating the status of the resource change (e.g., "Instance Terminated"). As a further example, an application of program execution service may request that additional tags be added to indicate the customer account associated with the computing resources so that, for instance, the tagged metrics data can later be processed for billing.

The application could also request that additional tags associated with the geographic zone, region, data center, etc. of the computing resources be added so that, for example, the tagged metrics data could be processed later based on the additional tags to perform statistical analysis on the computing resources. A variety of tags can be created or defined by a user or application and supported by program execution service 100. Requests for tagging of metrics data can be received by the acquisition module 208 in various ways. For example, a request can be received directly from a user (e.g., via an interactive console or other GUI provided by the program execution service 100), from an executing program of a user that automatically initiates the execution of other programs or other instances of itself, from programming tools (e.g., command-line tools, integrated development environments, etc.), from a program that interacts with the dynamic tagging manager 130 via an Application Programming Interface ("API") provided by the program execution service 100 (e.g., an API that uses Web services), and so forth.

Requests for tagging of metrics can include a number and/or type of tags, a minimum and/or maximum number of tags to use, a number and/or type of criteria to use in tagging the metrics, etc. The request for tagging can include other types of preferences, requirements, and/or restrictions (e.g., type of tagging preferred, frequency of tagging, conditions for tagging, etc.). Alternatively, the dynamic tagging manager 130 can be configured to provide options to the user for specifying these preferences, requirements, restrictions, etc. and/or configured to provide these options automatically.

The acquisition module 208 can also receive the request for tagging from a service. For example, the acquisition module 208 can receive the request for tagging from another module or server of the program execution service 100 or can receive the request from an external service. The request can include the tags, requirements, preferences, etc., as discussed above.

After the request for tagging is received by the acquisition module 204, the processing module 208 can process the request to determine one or more computing nodes that can be communicated with for tagging metrics data with the additional tags. The processing module 208 can analyze the additional tags and determine which computing nodes need to be communicated with in order to tag the metrics data with the additional tags. For example, for an additional tag associated usage of storage resources by the user, the processing module 208 can determine which storage nodes 134 are being used by the user. As another example, for an additional tag indicating which customers of the user are using a load balancer for billing purposes, processing module 208 can determine which load balancing nodes are being used by the user.

In certain embodiments, the user can specify which criteria the user desires for tagging, as discussed above, and processing module 208 can determine one or more additional tags based on the criteria and can determine one or more computing nodes that can be communicated with for tagging the metrics with the additional tags. For example, the user may indicate to acquisition module 208, via a wizard, for example, that the user's account with the program execution service is used for multiple customers and the user would like to be able to bill the customers directly based on their usage of computing resources. The user may indicate which computing resources are being used by which customer. The processing module 208 can then determine that additional tags associated with unique customer identification numbers would provide the tagging desired by the user and determine which computing nodes should be communicated with in order to perform the tagging. The processing module 208 may present the determined additional tags to the user so the user, another user, or application can later process the tagged metrics (discussed below).

In the embodiment illustrated in FIG. 2A, the tagging module 216 communicates with the one or more determined computing nodes to request the computing nodes to tag any measured or collected metrics with the additional tags. The interactions between the tagging module 216 and the one or more determined computing nodes can occur in various ways. For example, interactions can occur via an API other type of communication interface provided by the one or more determined computing nodes. The tagging module 216 could communicate the key/value pairs that should be added to any metrics measured or collected by the determined computing nodes. The tagging module 216 could also communicate any additional information needed by the determined computing nodes to enable the computing nodes to tag the data as desired. In some implementations, after tagging, acquisition module 208 can receive requests for one or more further additional tags or one or more modifications to the additional tags and the processing module 212 and tagging module 216 can perform any tagging, as discussed above, based on the one or more further additional tags or the one or more modifications to the additional tags.

Figure 4:
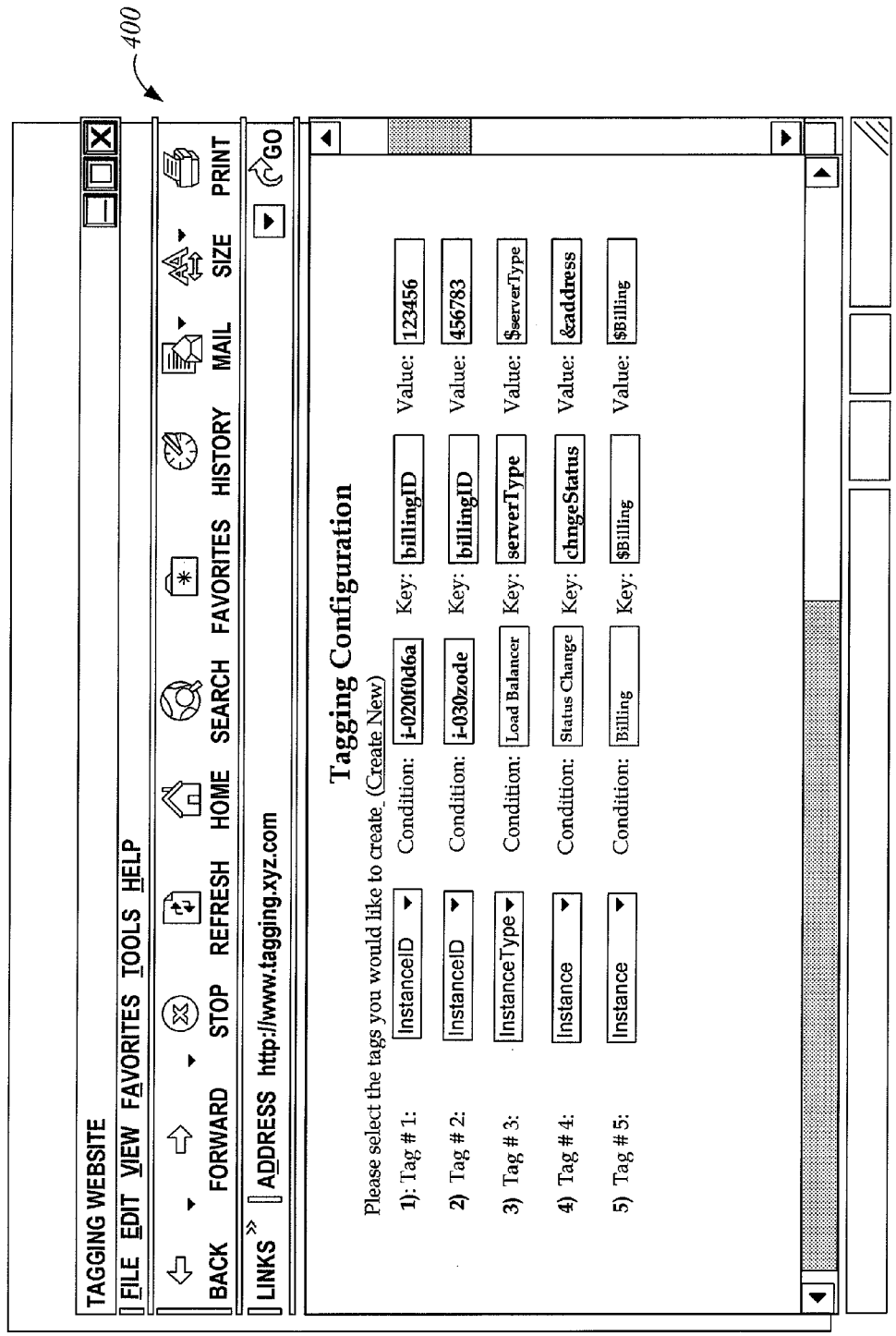
FIG. 4 is an example of a display that can be used to request tagging of metrics data.

FIG. 4 illustrates an example graphical user interface that could be presented to a user for requesting the program execution service to perform tagging on the metrics data, as discussed above. The acquisition module 408 could present the illustrated webpage to the user to enable the user to request tagging. As shown in FIG. 4, the user can specify multiple additional tags that should be added to the metrics data as discussed above. As some examples, Tag #1 and Tag #2 could be created by the user to request program execution service to tag any computing node instance having the indicated IDs with the specified key/value pairs that are indicated.

As disclosed above, adding these additional tags would allow a user or application to later process the tagged metrics data as desired (e.g., billing, etc.). Further, Tag #3 could be created by a user to specify that for any computing node instance that comprises a load balancer, a key "serverType" should be added. Since the user has specified a value of the key using a "$", program execution service could be configured to determine that value of the additional key in real-time or run-time and tag the metrics data with the additional key as specified by the user. For instance, if the program execution service determines at run-time that a load balancer is associated with a computing node instance associated with a web server, then the key "serverType" could be assigned a value "webServer" by the program execution service and the metrics data could be tagged with this additional tag. The values given to this key could be defined by the user and the program execution service. For example, the various values that could be assigned for a particular key (e.g., serverType) could be defined by the user and stored by program execution service using the storage nodes 134. These stored values could later be accessed by a computing node instance to determine a value that should assigned to a particular key.

Tag #4 could be created by a user to specify that an additional tag be created and added for any status change associated with a computing node instance. The user, as shown, has indicated that this additional tag should be given a key of "chngeStatus" and the value to be assigned to that key can be found by reference "&address" which can indicate the location that values for the key can be found. For example, as explained above, values that can be assigned to a particular key can be managed by storage nodes 134 and the "&address" can be a reference to storage nodes 134 that manages a list of values that can be assigned to a particular key that is stored in a data storage. As another example, "&address" could directly refer a storage location, Web address, etc. for which the list of values could be found. The values of the key may be determined by the dynamic tagging manager at the time of the user request and associated with the key, or the values can be determined in run-time by a computing node instance.

Tag #5 could be created by a user to specify that an additional tag be generated by the program execution service that would enable the user to perform billing by the user's customers. As discussed above, program execution service can then generate one or more additional tags based on the criteria specified by the user. For instance, program execution service may generate an additional tag have a key "custID" to provide the billing requested by the user. Program execution service can then assign the value associated with an identifier for customers and tag the metrics with these key/value pairs. Program execution service may determine the values to be assigned to a particular key similar to the examples given above. Moreover, program execution service may store the one or more keys that are generated using the storage nodes 134 so that users and applications processing the tagged metrics could later request the storage nodes to provide the keys that were used to tag the metrics. The list of keys could also be provided to the requesting user.

Returning to FIG. 2A, The dynamic tagging module 130 can be configured differently than illustrated in FIG. 2A. For example, various functionalities provided by the illustrated modules can be combined, rearranged, added, or deleted. In some embodiments, additional or different processors or modules can perform some or all of the functionalities described with reference to the example embodiment illustrated in FIG. 2A. Many implementation variations are possible.

Although described generally in terms of tagging of metrics data, in other embodiments, the dynamic tagging manager 130 can tag data of any type. These data types can include one or more of the following, for example: network data (e.g., network traffic, performance data, errors data, etc.); sales data (e.g., inventory data, profit data, revenue data, forecast data, etc.); financial data (e.g., investment data, credit data, insurance data, etc.); etc.

Figure 2B:
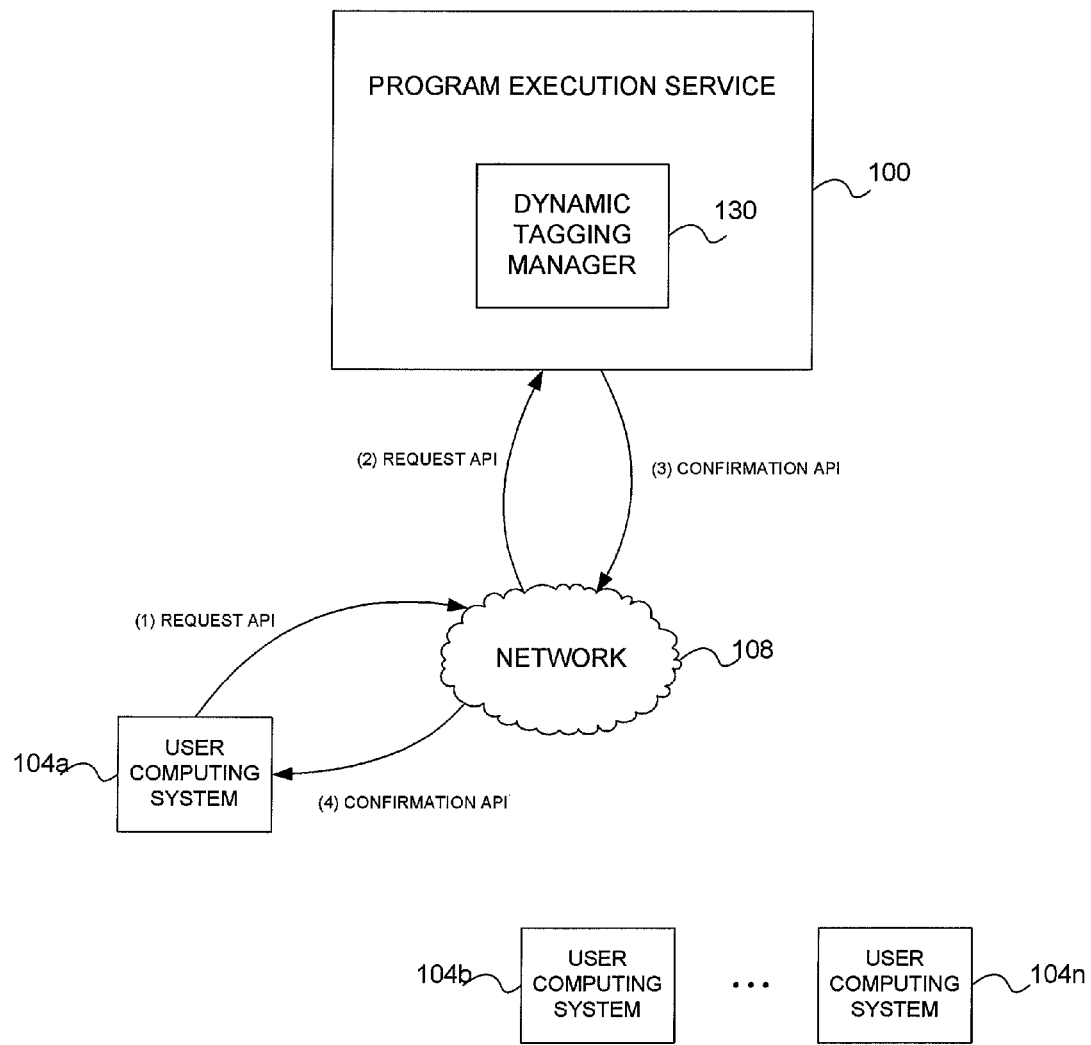
FIG. 2B is a network diagram schematically illustrating an example interaction between a user computing system and a dynamic tagging manager of a program execution service.

FIG. 2B is a network diagram schematically illustrating an example interaction between a user computing system 104a and a dynamic tagging manager 130 of a program execution service 100. The program execution service 100 can provide computing resources to multiple user computing systems 104a, 104b, . . . , 104n. In this illustrative example, the program execution service 100 provides an API for the user computing systems 104a, 104b, . . . , 104n to programmatically interact with the dynamic tagging manager 130.

FIG. 2B illustratively shows the user computing system 104a communicating a request for tagging of metrics data using a request API. The request API (1) is communicated via the network 108 and (2) is received by the dynamic tagging manager 130 of the program execution service 100. The request API can include information about the user's request such as, e.g., the number and/or type of tags, a minimum and/or maximum number of tags, the tags, a number and/or type of criteria to use in tagging the metrics, etc. The request API can include other information about the request such as, e.g., preferences, requirements, and/or restrictions related to the user's desires for the tagging of the metrics data. For example, the request API can include information on which users are to be granted access to tag the metrics data, type of tagging preferred, frequency of tagging, conditions for tagging, etc.

In the example shown in FIG. 2B, the dynamic tagging manager 130 communicates with a confirmation API (3) via the network 108 which is (4) received by the user computing system 104a. The confirmation API can include information related to whether the program execution service 100 can grant the request (in whole or in part). The confirmation API can also include one or more request identifiers (e.g., keys, tokens, user names, passwords, etc.) that are associated with the user's request and that are to be used in conjunction with tagging the metrics data. The confirmation API can include other information such as, e.g., information confirming that the user's preferences, requirements, and/or restrictions can be met.

FIG. 2B illustratively shows the user computing system 104a programmatically interacting via the API with the dynamic tagging manager 130 of the program execution service 100. The program execution service 100 can receive requests for tagging metrics data from other user computing systems (e.g., user computing systems 104b, . . . , 104n) via the API and can communicate confirmations to the other user computing systems via the API (such requests and confirmations are not shown in the illustrative example in FIG. 2B). The dynamic tagging manager 130 (or other suitable component) can present the tagged metrics data to multiple user computing systems. Other types of programmatic interactions (additionally or alternatively) between the program execution service 100 and the user computing systems are possible. For example, a request can be received directly from a user (e.g., via an interactive console or other GUI provided by the program execution service 100), from an executing program of a user that automatically initiates the execution of other programs or other instances of itself, etc.

Figure 2C:
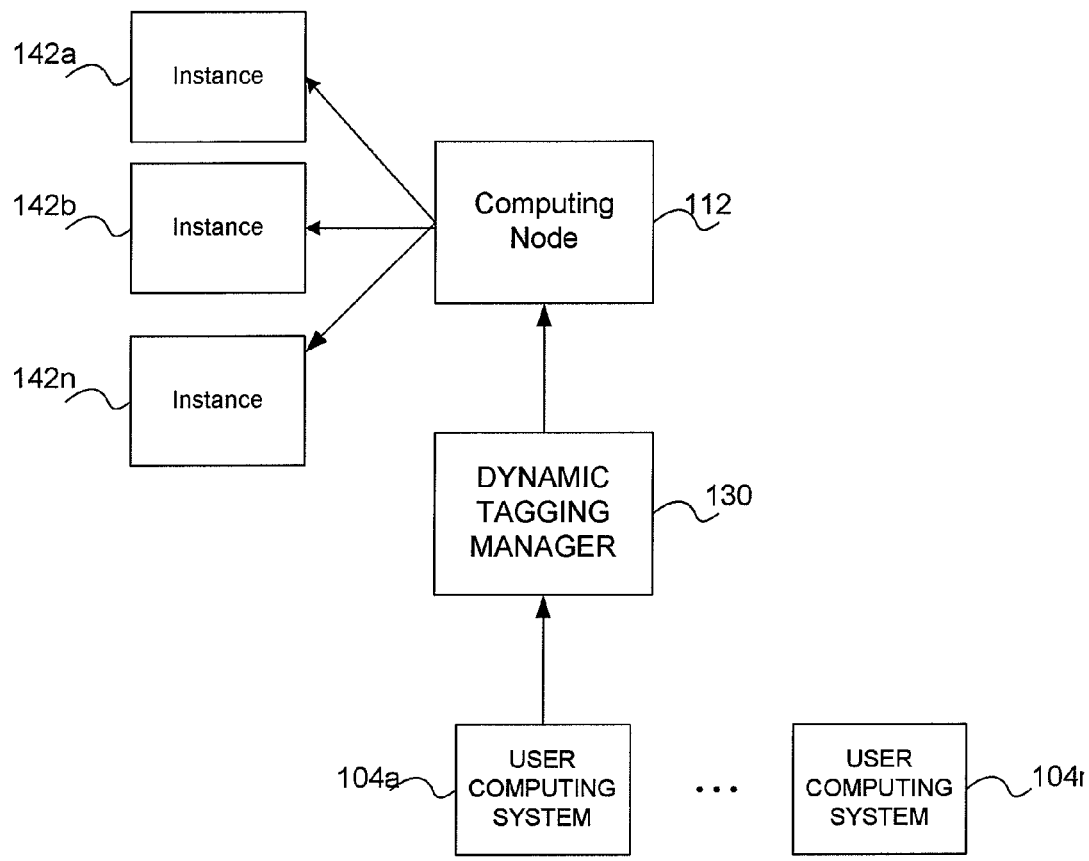
FIG. 2C is a network diagram schematically illustrating an example interaction between a dynamic tagging manager, a user computing system, and computing resources.

FIG. 2C is a system diagram schematically illustrating an example interaction between a user computing node 112 and a dynamic tagging manager 130 of a program execution service 100. The dynamic tagging manager 130 can request tagging of metrics data by instances 142a, 142b, . . . , 142n of computing node 112. As explained above, the dynamic tagging manager 130 can receive the requests for tagging from user computing system 104a, . . . , 104n. In one example, as explained above, the computing node 112 provides an API for the dynamic tagging manager 130 to programmatically interact with the computing node 112 and instances 142a, 142b, . . . , 142n. The communications between dynamic tagging manager 130 and computing node 112 can include information about the user's request such as, e.g., the number and/or type of tags, a minimum and/or maximum number of tags, the tags, etc. The communications can specify the key/value pairs that should be added to metrics data managed by the computing node 112 and other criteria or information needed by computing 112 to performing the tagging discussed above.

Figure 3:
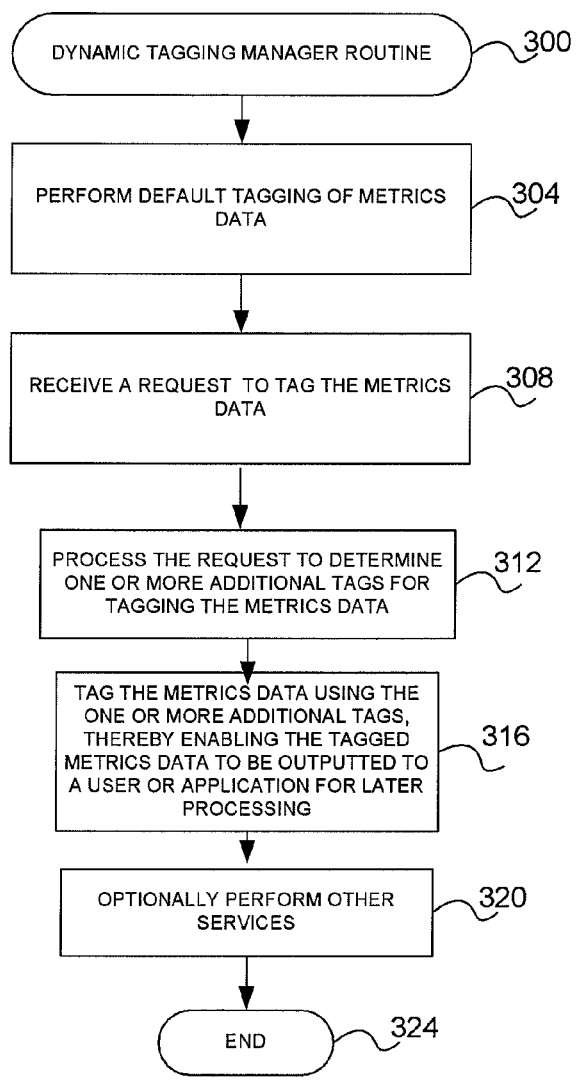
FIG. 3 is a flow diagram illustrating a dynamic tagging manager routine implemented by a dynamic tagging manager component.

FIG. 3 is a flow diagram that schematically illustrates an example embodiment of a dynamic tagging manager routine 300. In some implementations, the routine 300 can be implemented by embodiments of the dynamic tagging manager 130 of the program execution service 100 described with reference to FIGS. 1 and 2. The example routine 300 is described in terms of a user that makes a request for tagging of metrics data. The example routine 300 is intended to illustrate, but not to limit, various aspects of the dynamic tagging manager 130.

With reference to FIG. 3, the program execution service performs defaulting tagging of metrics data at block 304. The system designer specifies default tags that should be inserted or adding to metrics data managed, collected, monitored, etc. by program execution service. As explained above, a variety of default tags could be used and the number and/or type of default tags used could vary between respective metrics data as designed by the system designer. At block 308, a request is received by the dynamic tagging manager 130 from the user for tagging of metrics by the program execution service 100. As discussed above, the request can include a desired number and/or type of tags, a minimum and/or maximum number of tags, a number and/or type of criteria to use in tagging the metrics, etc. The request can specify that only a certain user (or users) be granted access to tag the metrics data. The request for tagging can include other types of preferences, requirements, and/or restrictions (e.g., type of tagging preferred, frequency of tagging, conditions for tagging, etc.).

At block 312, the dynamic tagging manager 130 processes the received request to determine one or more additional tags for tagging the metrics data. In various embodiments, the request for tagging includes the additional tags that are to be used for tagging the metrics. The program service 100 analyzes the request to determine the one or more additional tags. In some implementations, the received request can be used by the program service 100 to create or generate one or more additional tags. As discussed above, the received request may specify criteria to be used in tagging the metrics and program execution service may analyze the criteria to create one or more additional tags to be used in tagging the metrics.

With reference to FIG. 3, the routine 300 continues at block 316 where the dynamic tagging manager 130 tags the metrics data with the one or more additional tags, thereby enabling the tagged metrics to later be processed by a processing user or application. The dynamic tagging manager 130 determines one or more computing nodes that could be communicated with to perform tagging of the metrics data with the additional tags. The dynamic tagging manager 130 then communicates with the determined one or more computing nodes to request the computing nodes to tag the metrics data managed, collected, monitored, etc. by the computing nodes with the additional tags. The dynamic tagging manager 130 can provide the computing nodes the additional tags that are to be used to performing the tagging and the conditions, criteria, etc. that are to be used to perform the tagging.

At block 320, optionally other services can be performed by embodiments of the routine 300. For example, program service 100 can output to tagged metrics data to a processing user or application. Some examples of tagged metrics data could include the following example tags: "instanceID=i-020f0d6a"; "instanceType=storage node"; "Hostname=www.xyx.com"; "IP address=10.254.111.4"; "zone=us-east-1a"; "diskReadbytes=5 KB"; "datacenter=snap-8010f6e9"; "CPUUtilization=5 hours"; "billingID=123456"; or "instanceID=i-030g0w2b"; "instanceType=load balancer"; "zone=us-east-1b"; "billingID=123456," etc. Many other variations for tagged metrics data are possible. The dynamic tagging manager 130 can output the tagged metrics data to the processing user or application in a variety of ways. For example, the program service 100 can output the tagged metrics data using an API or other communication interface, a webpage, an interactive console, an application, or the like.

Figure 5:
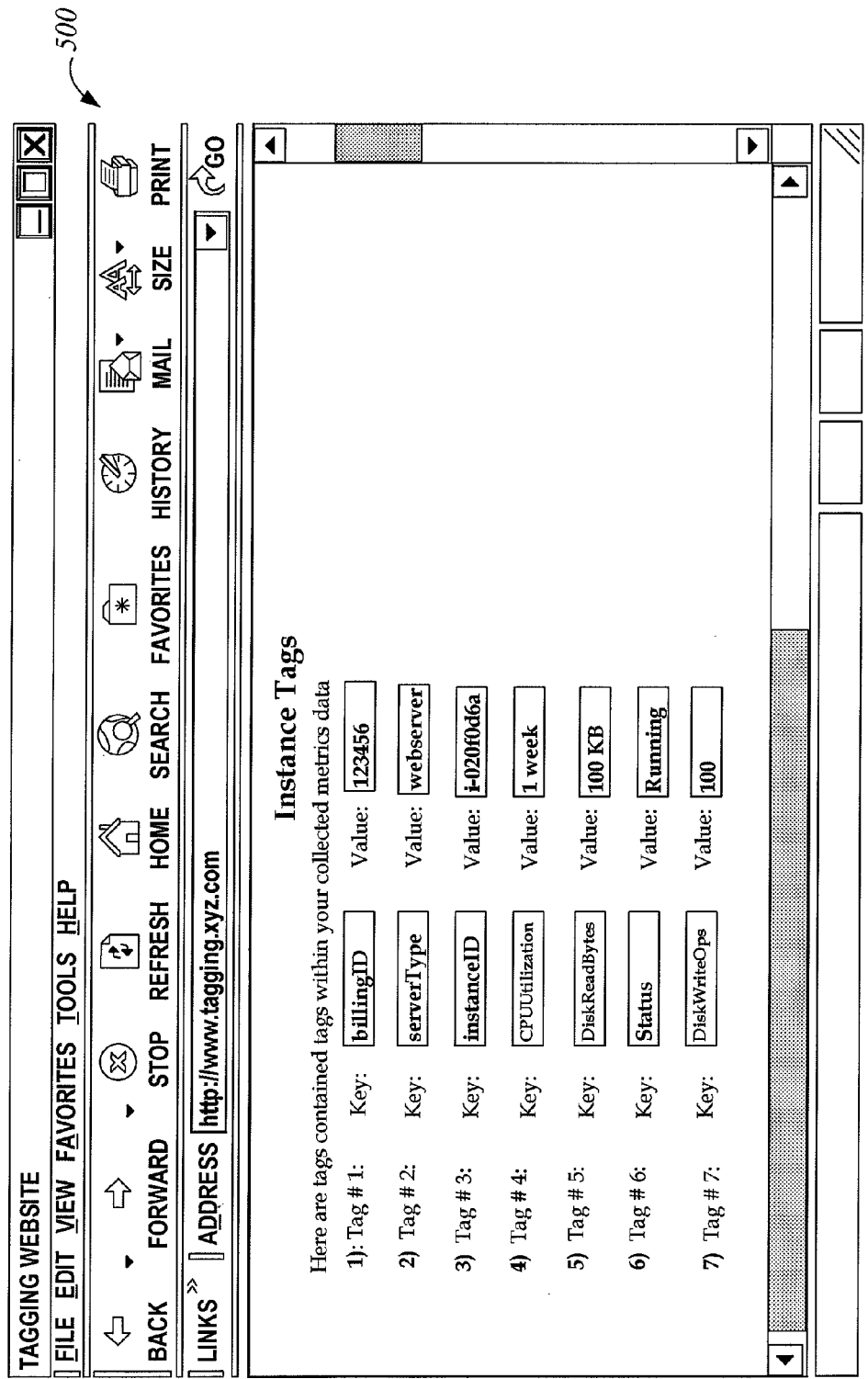
FIG. 5 is an example of a display that can be output for presentation of tagged metrics data.

FIG. 5 illustrates an example webpage that the program execution service can optionally output to a processing user. As illustrated, program execution service can output a webpage that lists all the tags contained within the tagged metrics data. Program execution service 100 can parse the tagged metrics data to determine that key/value pairs contained within the tagged metrics data and output them to the user. As shown, the tagged metrics data includes both the default tags and additional tags discussed above. As another example, the program execution service could output the tagged metrics data via an application associated with the program execution service to enable outputting the tagged metrics in any desired manner. For instance, the program execution service can output the tagged metrics to an aggregating application that aggregates metrics data based on their tags.

The aggregating application could, as an example, aggregate the tagged metrics data based on tags associated with customers and present them to a processing user or application so that the aggregated metrics could be processed for billing or statistical analysis purposes. The aggregating application could parse the tagged metrics to locate all tags associated with a customer and aggregate or group the metrics based on these tags (e.g., havening similar keys) or combination of the tags. A variety of aggregations and sub aggregations could be provided by the aggregating application and the tagged metrics data could also be outputted to a variety of other applications. In some implementations, the outputting of the tagged metrics could be provided by another service other than program execution service.

Each of the processes, methods, and algorithms described in the preceding sections can be embodied in, and fully or partially automated by, code modules executed by one or more computers or computer processors. The code modules can be stored on any type of non-transitory computer-readable storage medium or computer storage device, such as hard drives, solid state memory, optical disc, and/or the like. The systems and modules can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). The processes and algorithms can be implemented partially or wholly in application-specific circuitry. The results of the disclosed processes and process steps can be stored, persistently or otherwise, in any type of non-transitory computer storage such as, e.g., volatile or non-volatile storage.

The various features and processes described above can be used independently of one another, or can be combined in various ways. All possible combinations and subcombinations are intended to fall within the scope of this disclosure. In addition, certain method or process blocks can be omitted in some implementations. The methods and processes described herein are also not limited to any particular sequence, and the blocks or states relating thereto can be performed in other sequences that are appropriate. For example, described blocks or states can be performed in an order other than that specifically disclosed, or multiple blocks or states can be combined in a single block or state. The example blocks or states can be performed in serial, in parallel, or in some other manner. Blocks or states can be added to, or removed from the disclosed example embodiments. The example systems and components described herein can be configured differently than described. For example, elements can be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein can be embodied in a variety of other forms; furthermore, various omissions, substitutions and changes in the form of the methods and systems described herein can be made without departing from the spirit of the inventions disclosed herein. The accompanying claims and their equivalents are intended to cover such forms or modifications as would fall within the scope and spirit of certain of the inventions disclosed herein.

What is claimed is:

1. A system for tagging metrics, the system comprising:
  a computer system comprising computer hardware, the computer system managing a virtualization infrastructure generated on behalf of multiple users, wherein the computer system comprises one or more computing nodes and is programmed to implement:
a default tagging module configured to tag metrics related to performance of the one or more computing nodes with default tags comprising key and value pairs, by at least associating the default tags with the metrics;
an acquisition module configured to receive at least one additional tag comprising a key and one or more criteria for the at least one additional tag from a requesting user or application, wherein the at least one additional tag has a different key than the default tags;
a processing module configured to analyze the at least one additional tag to determine one or more computing nodes to communicate with in order to dynamically tag the metrics with the at least one additional tag based at least in part on the one or more criteria for the at least one additional tag; and
a tagging module configured to communicate with the determined one or more computing nodes to request tagging of the one or more metrics with the at least one additional tag, thereby producing tagged metrics that may subsequently be aggregated, wherein tagging of the one or more metrics comprises:
associating the at least one additional tag dynamically with each metric in a subset of the metrics if the one or more criteria for the at least one additional tag are satisfied by each metric in the subset of metrics, and
assigning a dynamic value to the at least one additional tag for each metric in the subset of metrics that the at least one additional tag is associated with, based at least in part on the key of the at least one additional tag.

2. The system of claim 1, wherein the acquisition module is further configured to receive at least one of the at least one additional tags from the requesting user.

3. The system of claim 2, wherein at least one of the tags received from the requesting user relates to a billing identifier associated with the requesting user.

4. The system of claim 1, wherein the tagging module is further configured to tag the one or more metrics by communicating with the plurality of computing nodes.

5. The system of claim 1, wherein the tagged metrics are configured to be aggregated by a processing user or application.

6. The system of claim 1, wherein the acquisition module is further configured to enable a user to specify the at least one additional tag.

7. The system of claim 6, wherein the acquisition module is further configured to enable a user to specify the key of the at least one additional tag.

8. A method of tagging metrics, the method comprising:
by one or more computer systems comprising computer hardware:
tagging one more metrics with default tags comprising key and value pairs;
receiving at least one additional tag comprising a key and one or more criteria for the at least one additional tag from a requesting user or application, wherein the at least one additional tag has a different key than the default tags;
analyzing the at least one additional tag to determine one or more computing nodes to communicate with in order to tag the one or more metrics with the at least one additional tag based at least in part on the one or more criteria for the at least one additional tag; and
communicating with the determined one or more computing nodes to request tagging of the one or more metrics with the at least one additional tag, thereby producing tagged metrics to subsequently be processed, wherein tagging of the one or more metrics with the at least one additional tag comprises:
associating the at least one additional tag dynamically with each metric in a subset of the one or more metrics if the one or more criteria for the at least one additional tag are satisfied by each metric in the subset of one or more metrics, and
assigning a dynamic value to the at least one additional tag for each metric in the subset of one or more metrics that the at least one additional tag is associated with, based at least in part on the key of the at least one additional tag.

9. The method of claim 8, further comprising communicating with the plurality of computing nodes using an application programming interface.

10. The method of claim 8, further comprising receiving at least one modification to the at least one additional tag from the requesting user or application and performing the analyzing and communicating steps based at least upon the at least one modification.

11. The method of claim 8, wherein at least one of the computing nodes comprises one or more of the following: a load balancer, a firewall, a physical machine, a virtual machine, a storage node, and a database server.

12. The method of claim 8, wherein the tagged metrics are processed by a processing user or application.

13. The method of claim 12, further comprising outputting the tagged metrics to the processing user or the processing application.

14. The method of claim 12, wherein at least one of the at least one additional tags is from the requesting application.

15. The method of claim 14, wherein the requesting application and processing application are different.

16. The method of claim 12, wherein at least one of the at least one additional tags is from the requesting user.

17. The method of claim 16, wherein the requesting user and processing user are different.

18. Non-transitory physical storage comprising executable instructions stored thereon, the executable instructions configured to cause a computing system to at least:
receive at least one tag to be used in tagging data and one or more criteria for the at least one tag from a requesting user or application, wherein the at least one tag comprises at least one key;
analyze the at least one tag to determine one or more computing nodes to communicate with in order to tag the data with the tags based at least in part on the one or more criteria for the at least one tag; and
communicate with the determined one or more computing nodes to request tagging of the data with the tags, thereby producing tagged data to subsequently be processed, wherein tagging of the data comprises:
associating the at least one tag dynamically with the data if the one or more criteria for the at least one tag are satisfied by the data, and
assigning a dynamic value to the at least one tag, based at least in part on the key of the at least one tag.

19. The non-transitory physical storage of claim 18, wherein the tagged data is configured to be processed by a processing user or application.

20. The non-transitory physical storage of claim 19, further comprising outputting the tagged data to the processing user or the processing application.

21. The non-transitory physical storage of claim 19, wherein at least one of the at least one tag is received from the requesting application.

22. The non-transitory physical storage of claim 21, wherein the requesting application and processing application are different.

23. The non-transitory physical storage of claim 19, wherein at least one of the at least one tag is received from the requesting user.

24. The non-transitory physical storage of claim 23, wherein the requesting user and processing user are different.

25. The non-transitory physical storage of claim 18, in combination with a computing device that is configured to execute the executable instructions.

26. A method of tagging metrics, the method comprising:
by a computer system comprising computer hardware:
receiving at least one additional tag to be used in tagging metrics and one or more criteria for the at least one additional from a requesting user or application, wherein the at least one additional tag comprises at least one key that is different than keys of default tags associated with the metrics;
tagging metrics with the at least one additional tag based at least in part on the one or more criteria for the at least one additional tag, wherein tagging the metrics comprises:
associating the at least one additional tag dynamically with each metric in a subset of the metrics if the one or more criteria for the at least one additional tag are satisfied by each metric in the subset of metrics, and
assigning a dynamic value to the at least one additional tag for each metric in the subset of metrics that the at least one additional tag is associated with; and
outputting the tagged metrics and the at least one additional tag.

27. The method of claim 26, wherein the tagged metrics are outputted to a processing user or application.

28. The method of claim 26, wherein at least one of the at least one additional tags is from the requesting application.

29. The method of claim 26, wherein the computing system comprises a plurality of computing devices.

* * * * *